United States Patent [19]
Kok

[11] 3,744,096
[45] July 10, 1973

[54] BINDER

[75] Inventor: Albertus Jacobus Theodorus Kok, Nyon, Switzerland

[73] Assignee: IPP Industrial Polymer Processing S.A., Vaud, Switzerland

[22] Filed: Jan. 28, 1972

[21] Appl. No.: 221,676

[30] Foreign Application Priority Data
Feb. 1, 1971 Switzerland.......................... 1446/71

[52] U.S. Cl. ................................. 24/16 PB, 24/278
[51] Int. Cl. ............................................. B65d 63/00
[58] Field of Search.................... 24/123 D, 265 EE, 24/16 PB, 30.5 P, 30.5 L, 278; 248/74 PB, 73

[56] References Cited
UNITED STATES PATENTS

| 2,375,507 | 5/1945 | Van Tuyl et al................. | 24/278 X |
| 2,452,186 | 10/1948 | Fluharty............................ | 24/278 X |
| 3,066,366 | 12/1962 | Wyckoff et al. ................. | 24/16 PB |
| 3,214,808 | 11/1965 | Litwin............................... | 24/16 PB |
| 3,283,378 | 11/1966 | Cramton .......................... | 24/16 PB |

FOREIGN PATENTS OR APPLICATIONS

| 14,567 | 9/1934 | Australia .......................... | 24/30.5 P |
| 1,332,600 | 6/1963 | France .............................. | 24/16 PB |
| 1,158,237 | 1/1958 | France ............................. | 24/30.5 L |

Primary Examiner—Donald A. Griffin
Attorney—Molinare, Allegretti, Newitt & Witcoff

[57] ABSTRACT

The invention provides a binder having a plastics strap of indefinite length formed with notches over its entire length to define locking positions for a separate blocking device having a member formed with a passage for the two end portions of the strap and locking teeth for engaging in the notches of the strap. The strap may for instance be made by extruding a continuous plastics tape and passing the tape between a pair of rollers of which one is provided with notch-forming teeth over its circumference, the tape being subsequently cut into straps of required length.

8 Claims, 4 Drawing Figures

BINDER

This invention relates to binders.

For instance in packaging, use is made of numerous kinds of binders that comprise a strap of synthetic material and a blocking device for keeping the strap in place once it has been tightened around the object or objects being packaged. These binders fall into two main classes, to wit those where the strap and at least part of its blocking device are moulded together in un-dissociable manner, and those where the strap is extruded and is used with a separate blocking device.

Binders of the first class are very convenient. The can be well tightened and are self-locking by virtue of transverse grooves formed in one face of their straps and by virtue of teeth provided in their blocking devices. These binders suffer however from the double drawback of being of limited length, since they come out of a mould or matrix, and of giving rise to substantial losses of material since the end portion of the strap being used in such a binding is cut off without any possibility of it being re-used.

Binders of the second class, because their straps are extruded, are not, as a general rule, subject to the limitation in length of the first class. They are therefore much used for packaging objects of larger circumference. Their straps are generally smooth and to prevent them from slipping after the binders have been tightened use is made of steel blocking devices, such as clasps that clamp the end portions of the straps very tightly together, or such as rivets which necessitate holes being made in the straps. In this latter case it is difficult properly to tighten the straps around the objects to be bound and in both cases they are not self-locking.

There has also been proposed a form of binder comprising a strap of extruded synthetic material in the surface of which are made transverse grooves over the entire length of the strap, and comprising a separate blocking device. This strap is produced by first extruding a tube with an extruder having an annular die which is formed along one of its edges with an uninterrupted succession of teeth corresponding to the profile of the grooves to be produced in the straps. After cooling the extruded tube, the latter is cut transversely to yield a succession of endless straps. Whereas the tube could be of indeterminate length, the straps are of limited length like the straps of the first class of binders; they suffer therefore from the same major drawback as the binders of the first class, to wit the fact that they are of limited length.

An object of the invention is to combine, at least some extent, the advantages of the above mentioned two classes of bindings while eliminating, at least partially, their drawbacks.

The binder provided by the invention comprises a strap of synthetic material of indeterminate length formed with superficial notches over its entire length and defining locking positions for a separate blocking device.

Thus, the strap has the great advantage that it can be dispensed from a roll as by a tool in which the roll is mounted. When packaging an object, the free end of the roll is passed through a part of the blocking device over a distance corresponding more or less to the circumference of the object to be packaged, the object is surrounded and this same free end is again made to pass, but in the opposite direction, through the said part of the blocking device but only allowing a minimum length of strap to protrude, and the strap portion joined to the roll is pulled until the object is sufficiently tightly bound. Aftethe blocking device has locked, this strap portion is cut near the device; accordingly no or hardly any wastage occurs. The strap can thus have a length ranging from, say, a few centimetres to, in the extreme case, the length of the roll, the length of the roll being unlimited.

In a particular form of embodiment of the binder according to the invention, the binder comprises a self-locking blocking device and the superficial notches consist of transverse grooves formed in one face of the strap, these grooves being turned outwards when the strap is placed around the object to be bound. Moreover, the blocking device preferably consists of a single moulded part through which extends a passage for the two end portions of the strap and which is formed with teeth at the downstream end of the passage (in the direction of the pull exerted on either or both of the end portions to tighten the binder) which come into close engagement with the grooves of the strap by a rocking action at the end of the tightening operation.

There is also disclosed a method of making a strap for the binder according to the invention. The method comprises continuously extruding a band of synthetic material and passing the band between a pair of rollers of which at least one is formed over its circumference with projecting elements for forming in the band superficial notches over the entire length of the band, the band being subsequently cut to form a strap of the required length.

The width of the band may correspond to the width of the strap or to a multiple of this width. In the latter case, the band, which then consists of a sheet, is cut lengthwise into a plurality of tapes, the latter being then subsequently cut to produce straps.

In the accompanying diagrammatic drawings, given by way of example:

Figure 1:
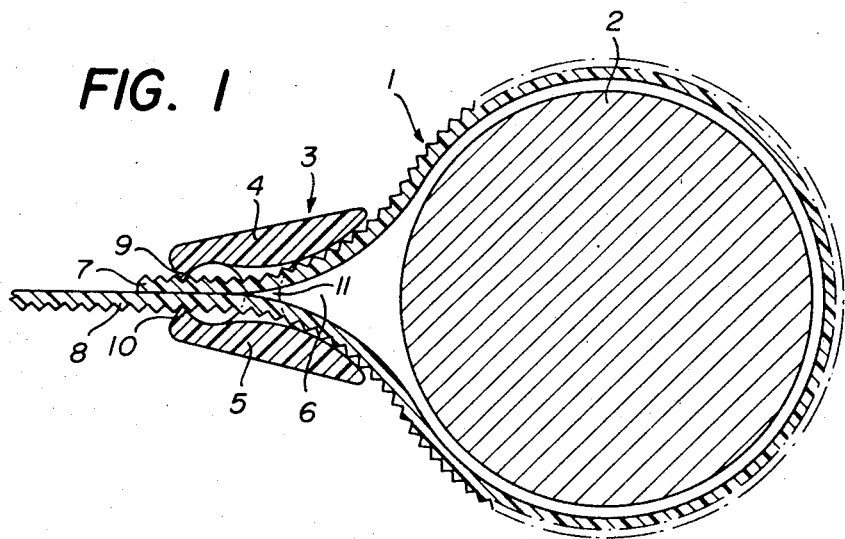
FIG. 1 shows, in section, a first form of embodiment of the binder according to the invention, which being fitted around an object.

The binder shown in FIG. 1 is made up of a strap 1, surrounding an object 2, and of a blocking device 3.

The strap 1 consists of a length of extruded tape of synthetic material, such as polyamide or polypropylene, this length being for instance cut off a roll. One face of the tape is transversely notched over its entire length whereas its other face is smooth, or practically so; the same will therefore be the case with each strap that is cut off the roll of tape.

The blocking device 3 here consists of a single part moulded from a tough synthetic material such as polyamide or polyacetal. This part comprises two spaced apart limbs 4 and 5 so inclined in relation to each other as to form therebetween a passage 6 which becomes narrower from its "upstream" end, i.e. the end located adjacent the object 2, towards its "downstream" end, i.e. the end at which the end portions 7 and 8 of the strap 1 issue.

Figure 2:
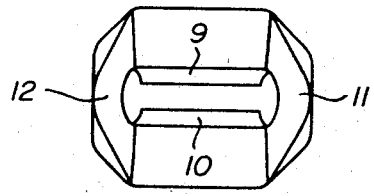
FIG. 2 is an end view of part of the binder shown in FIG. 1, from its right hand end.

The downstream end of the passage 6 forms, as can be seen in FIG. 2, a transverse slot and the longitudinal edges of this slot are formed by two sharp teeth 9 and 10 integral with the limbs 4 and 5 respectively and intended to come into engagement with the notches of the strap 1. Normally, this slot has a width equal to or slightly greater than twice the thickness of the strap 1, measured from the bottom of a notch.

The limbs 4 and 5 are connected to each other along their longitudinal edges and between their ends by two bridge portions 11 and 12 that are integral with the limbs 4 and 5. These bridge portions 11 and 12, which are preferably located nearer the downstream end of the passage 6 than its upstream end, are designed to be slightly flexible and elastic and hence to act as spring hinges between the two limbs.

To fit this binder around the object 2, the upstream ends of the limbs 4 and 5 of a blocking device such as 3 are first squeezed to move the teeth 9 and 10 apart to some extent and the free end of a notched tape, like that shown, is threaded through the broadened slot formed by teeth 9 and 10 and is made to issue from the upstream end of the passage 6. A certain length of tape is then pulled through the device 3, enough for it amply to surround the object 2. This length of tape is then placed around the object 2 with the notches turned outwards and the free end of the tape is again threaded through the passage 6, but this time in the opposite direction, i.e. from its flared end. To do this, the teeth 9 and 10 are kept spaced apart or are spaced apart again by pressing on the upstream ends of the limbs 4 and 5, sufficiently so to more or less double the width of the slot between the teeth 9 and 10. As will be observed from FIG. 1, only a very short portion 7 is made to issue from the passage 6.

To tighten the binder around the oject 2, the portion 8 is pulled with one hand while holding the limbs 4 and 5 of the device 3 between the thumb and forefinger of the other hand and pushing the device 3 towards the object. In so doing, the tooth 9 of the device 3 remains in engagement with one of the notches of portion 7, the smooth back of portion 8 slides over the smooth back of the stationary portion 7 and the notches of portion 8 travel past the tooth 10 whilst cooperating therewith in the manner of a ratchet. When the portion 8 has been pulled to the fullest extent and the device 3 comes to be strongly pressed against the part of the tape surrounding the object 2, the upstream ends of the limbs 4 and 5 are moved apart from each other under the action of the tension to which this part of the tape is subjected. Thus, besides the strong engagement that already exists between the tooth 9 and one of the notches of portion 7, and equally strong engagement comes to be established between the tooth 10 and one of the notches of portion 8, preventing any subsequent undesired slipping action of either portion 7 or 8 in relation to the teeth 9 and 10. The device 3 is thus self-locking. It is to be noted that the blocking action of the device 3 is enhanced by the fact that the axis of the hinges formed by the bridge portions 11 and 12 lies closer to the downstream end of the passage 6 than to its upstream end.

After having performed this tightening and blocking operation, the tape is cut so as to provide the resulting strap 1 with an end portion 8 of the same length as the portion 7. It will be observed that there is practically no wastage of tape at all.

If the binder thus fitted is to be removed or loosened, the upstream ends of the limbs 4 and 5 of the device 3 are pressed together with a pair of pliers and one of the end portions 7 and 8 of the strap 1 will start sliding past the tooth 9 or 10 under the action of the tension in the strap. By exerting a suitable amount of pressure on the limbs 4 and 5, this end portion can be made to move notch by notch, in controlled fashion, past the corresponding tooth or to disappear all at once through the slot formed by the teeth 9 and 10.

Figure 3:
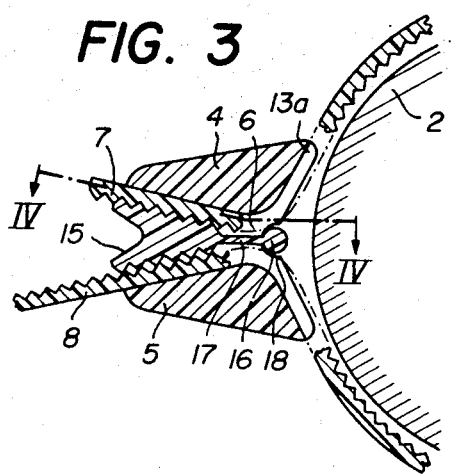
FIG. 3 is a partial representation, in section, of a second form of embodiment of the binder according to the invention, while being fitted around an object.
Figure 4:
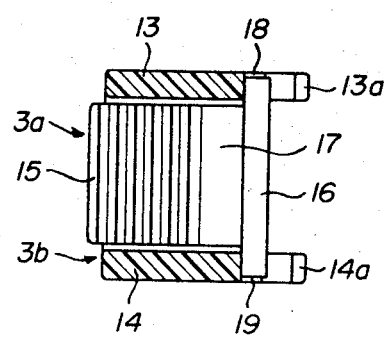
FIG. 4 is a horizontal sectional view along line IV—IV of FIG. 3 of part of the binder shown in that figure.

In the binder shown in FIG. 3, the strap 1 comes from the same roll of tape as before but its notches are here turned towards the inside of the loop which it forms around the object 2, and the blocking device is made up of two parts 3a and 3b instead of a single one, the part 3a comprisng, as in the preceding case, two limbs 4 and 5 forming therebetween a passage 6, these limbs being here connected to each other along their longitudinal edges by two flanges 13 and 14 which, at their right-hand end, project slightly beyond the limbs 4 and 5 to form guides 13a and 14a for the tape when it is being placed in position.

The passage 6 becomes narrower from its downstream end towards its upstream end, unlike the previous case. In this passage 6 the part 3b is permanently inserted. This part 3b is made up of a portion 15, in the form of a wedge, of a portion 16 forming a retaining pin, and of a portion 17 linking the wedge 15 to the pin 16. The downstream end of the wedge 15 has a thickness which exceeds slightly the distance between the limbs 4 and 5 at the upstream end of passage 6, i.e. the narrowest end of the latter, thereby preventing the part 3b from leaving the part 3a through that end of the passage. The ends of the pin 16 extend into recesses 18 and 19 formed in the guides 13a and 14a at the middle of the latter so that the pin 16 should lie in the mean plane of the passage 6. This pin 16 thus prevents the part 3b from leaving the part 3a through the downstream end of this passage.

When the binding is in place, the notches on the end portions 7 and 8 of the strap 1 engage with teeth formed over both faces of the wedge 15. Under these conditions, the wedge 15 will lie slightly deeper in the passage 6 but the pin 16, although it will then lie partly out of the recesses 18 and 19, will not come into contact with the object 2 and hinder the blocking action of the wedge 15.

But when fitting the binding (this operation being substantially the same as that involved in fitting the binding described with reference to FIGS. 1 and 2 except that no pressure need be exerted on the limbs 4 and 5), the wedge comes to occupy a position slightly more downstream in relation to its blocking position, under the action of the pull exerted on the end portion 8 to enable the notches of this end portion to move past the teeth on the lower face of the wedge 15, in the manner of a ratchet, and thus enable the strap 1 to be tightened round the object 2. In the course of this relative movement between the end portion 8 and the wedge 15, the teeth on the upper face of the latter remain in engagement with the notches of the end portion 7, thereby preventing the latter from issuing from the part 3a through the upstream end of the passage 6. When the strap 1 is tight and one stops pulling on the end portion 8, the wedge moves to the right under the action of the tension existing in the strap 1 and the teeth on the lower face of the wedge 15 come into firm engagement with the notches of the end portion 8.

While the strap 1 is being pulled tight, the wedge 15 will only be able to move to the left to the extent allowed by the pin 16, such movement being preferably reduced to a minimum so that the free play of the pin 16 should also be reduced to a minimum so as firstly not to interfere with the tightening operation and secondly not to come into contact with the object 2 once this tightening operation has been completed.

To avoid any free play of the pin 16 while still allowing the wedge 15 to move to the left during a tightening operation, the tongue 17 can, by way of modification, be arranged to be elastic.

As in the case of the member 3 visible in FIGS. 1 and 2, the part 3a is moulded from a tough synthetic material such as polyamide or polyacetal. But the part 3b can be produced by extrusion, the die of the extruder used for such an extrusion having a shape corresponding to the profile of the part 3b as seen in FIG. 3, the extruded element being then cut in suitable manner to produce a succession of parts 3b. The material used for the part 3b can be the same as that used for the part 3a or different.

As for the strap 1, it is cut from a tape produced by extrusion. This tape may for example be made by continuously extruding a sheet having a width corresponding to a multiple of the width of the strap 1, in then passing this sheet between a pair of rollers of which one is formed on its circumference with transverse teeth which come to form in one surface of the sheet grooves corresponding to the notches of the belt. The other roller is basically smooth but may bear, in recessed or raised but negative form, inscriptions and/or marks which will appear on the opposite surface of the sheet. The two rollers are preferably cooled in controlled manner by internal circulation of water and they are so located, in relation to the extruder die, that the extruded matter passes therebetween as it solidifies. The pressure exerted by the rollers on the extruded material determines the thickness of the sheet and the cooling rate that is obtained with these rollers determines the definition of the imprints they make in the sheet. On leaving the rollers, the sheet is dipped into a bath of cooling water, then passes between a pair of caterpillars of a pulling unit, after which it is cut lengthwise into a plurality of tapes.

The roller serving to produce the transverse grooves in the extruded sheet can by way of modification be formed with discontinuous transverse teeth so as to define several circumferential series of teeth of equal width, and be formed between these series of teeth with smooth surfaces flush with the ridges of the teeth. Sheets can thus be produced having thinner longitudinal strips and the cutting up of the sheet into tapes takes place down the middle of these strips, thereby facilitating the cutting operation. The transverse grooves of these tapes thus stop short of the edges of the latter, leaving along each edge a smooth margin.

Although it is preferred to provide the straps 1 with transverse grooves and to provide the blocking devices with corresponding teeth to set up a positive connection between the straps and the blocking devices, other kinds of notches can be made in the straps and other means capable of coming into positive engagement with these notches can be provided in the blocking devices.

The blocking devices visible in FIGS. 1 to 4 could, if desired, be replaced by blocking devices made of metal. Such blocking devices made of metal have the advantages that they can be produced by stamping out of thin sheet metal, that they are as a result of small volume and that they can be stacked.

I claim:
1. A binder device comprising, in combination: strap means; and
separate cooperating clamp means;
said strap means having a longitudinal dimension, opposed faces, and a plurality of integral notches on one of said faces;
said clamp means having a passage through which the opposite ends of said strap means may be inserted, said passage including an upstream end for initial insertion of said ends and a downstream end, said clamp also including opposed teeth engaging means at the downstream end for cooperation with the notches of said strap means and for maintaining said strap means wrapped tightly about an object, said strap means being engageable with said upstream end of said clamp means to rock said teeth into engagement with said notches when said strap means is pulled tightly about an object.

2. The device of claim 1 wherein said clamp means is a unitary element including first and second spaced members defining said passage, said members being connected along opposite edges by flexible bridging portions.

3. The device of claim 1 wherein said passage has a lesser cross sectional area at the downstream end.

4. The device of claim 1 wherein said notches are transverse to the longitudinal dimension.

5. The device of claim 1 wherein said notches are provided on only one face of said strap means for engagement with said teeth engaging means and the opposite side of said strap means is substantially smooth, said smooth sides being adjacent to one another when said strap means is attached with said clamp means.

6. The device of claim 1 wherein said notches extend only partially across the face thereby defining smooth margins adjacent the edges of said strap means.

7. Clamp means for use with a strap having a plurality of notches at least on one side thereof and opposite ends comprising, in combination:
a member having a passage therethrough for receipt of said opposite ends; said passage having an upstream end for initial insertion of said ends and a downstream end, said member also including teeth engaging means at said downstream end for engaging the notches of said strap means and maintaining said strap wrapped tightly about an object, said teeth being moved into position for close engagement with said notches when strap means are pulled tightly about an object to engage the upstream end of said clamp means.

8. The clamp means of claim 7 comprising spaced members defining said passage, said members being connected along opposite edges by flexible bridging portions.

* * * * *

UNITED STATES PATENT OFFICE
CERTIFICATE OF CORRECTION

Patent No. 3,744,096  Dated July 10, 1973

Inventor(s) Albertus Jacobus Theodorus Kok

It is certified that error appears in the above-identified patent and that said Letters Patent are hereby corrected as shown below:

Column 6, line 21, after "clamp", insert -- means --; same line, "teeth" should read -- notch --; line 26, "teeth" should read -- engaging means --.

Signed and sealed this 24th day of December 1974.

(SEAL)
Attest:

McCOY M. GIBSON JR.
Attesting Officer

C. MARSHALL DANN
Commissioner of Patents